United States Patent [19]

Adams et al.

[11] Patent Number: 5,280,946
[45] Date of Patent: Jan. 25, 1994

[54] COVER FOR AIR BAG INSTALLATION

[75] Inventors: Gary Adams, Brigham City; Paul Strahl, Ogden; Davin Saderholm, Salt Lake City; Bradley D. Harris, Farmington, all of Utah

[73] Assignee: Morton International, Inc., Chicago, Ill.

[21] Appl. No.: 891,834

[22] Filed: Jun. 1, 1992

[51] Int. Cl.$^5$ ............................................. B60R 21/16
[52] U.S. Cl. ............................ 280/728 A; 280/728 B; 220/315
[58] Field of Search ............... 280/728, 730, 731, 732, 280/743, 728 A, 728 R, 730 R, 728 B; 403/289, 335; 220/315

[56] References Cited

U.S. PATENT DOCUMENTS

| | | |
|---|---|---|
| 3,539,200 | 11/1970 | Chute ................................ 280/731 |
| 4,148,503 | 4/1979 | Shiratori et al. |
| 4,334,699 | 6/1982 | Patzelt et al. |
| 4,752,083 | 6/1988 | Honda. |
| 4,852,907 | 8/1989 | Shiraki et al. |
| 4,968,057 | 11/1990 | Rafferty. |
| 5,013,065 | 5/1991 | Kreuzer. |
| 5,022,676 | 6/1991 | Rogerson et al. |
| 5,024,464 | 6/1991 | Kawaguchi et al. |
| 5,060,971 | 10/1991 | Nanbu et al. .................. 280/728 B |
| 5,066,038 | 11/1991 | Frantom et al. |
| 5,092,627 | 3/1992 | Igawa. |

FOREIGN PATENT DOCUMENTS 63-184545  7/1988  Japan .................................. 280/743

Primary Examiner—Karin L. Tyson
Attorney, Agent, or Firm—Gerald K. White

[57] ABSTRACT

An improved automotive air bag assembly includes a sheet metal housing having a cover formed of a homogeneous plastic. The cover is formed with locking arms for engaging the rim of the housing. Two of the locking arms are clamped onto the rim by a clamping member and two orthogonal locking arms are not so clamped. The cover defines tear lines whose thickness varies to control the sequence and direction of tear whereby doors are created whose hinges form in thickened regions of the cover material.

12 Claims, 3 Drawing Sheets

COVER FOR AIR BAG INSTALLATION

TECHNICAL FIELD

This invention relates to air bags for automotive crash protection. More specifically, it relates to an improved cover assembly for an air bag installation.

BACKGROUND ART

Automotive air bags are commonly installed to protect both the driver and the front seat passenger from injury in the event of a head-on collision. The term "air bag" is something of a misnomer because, typically, the bag is filled with a rapidly evolving gas produced by an ignitor. The bag is designed to inflate in no more than approximately 50 milliseconds. In its uninflated and folded condition it is mounted within a housing having a cover which is designed to tear along predetermined lines to provide an opening for the escape of the air bag.

In view of the explosive nature of the air bag inflation, one of the major problems with prior art installations has been the tendency of the air bag cover to part from its housing or to break into pieces. The air bag cover or its pieces thereby become projectiles capable of inflicting damage on the occupants.

Various approaches have been employed in the prior art to overcome this problem. In one such approach, the plastic cover member is strengthened by embedding therein a fabric band made of a highly tear resistant material. Such an approach, for example, is disclosed in U.S. Pat. No. 4,334,699 of Patzelt et al. In another approach disclosed in U.S. Pat. No. 5,092,627 of Igawa, the plastic cover is riveted to a metal plate which deforms as the cover breaks open. U.S. Pat. No. 4,968,057 of Rafferty discloses metal sheet inserts which are also riveted to the housing. Other approaches to the solving of these problems will be found in U.S. Pat. Nos. 4,148,503 of Shiratori et al., U.S. Pat. No. 4,852,907 of Shiraki et al., and U.S. Pat. No. 5,013,065 of Kreuzer.

One of the major problems with all of the prior art solutions is that they are expensive to implement and result in an undesirably heavy air bag installation. Furthermore, the covers lack flexibility with the result that they are not easily assembled. Accordingly, it is a primary object of the present invention to provide an air bag installation comprising a molded cover which requires no reinforcements. Another object is to provide such a cover which is sufficiently flexible that it may be readily assembled to the air bag housing. Another object is to provide such an assembly wherein the energy of the expanding air bag is dissipated in a managed way to prevent the cover from breaking up. Another object is to provide a cover which is designed so that, as it opens, it flexes in such a manner that it becomes more firmly secured to the housing. Other objects, features, and advantages will become apparent from the following description and appended claims.

DISCLOSURE OF INVENTION

The invention comprises a sheet metal air bag housing having a peripheral rim. A molded plastic cover includes a plurality of locking arms which engage the rim of the housing. A retainer mounted to the bottom of the housing secures a pair of opposed locking arms to the housing rim. The cover defines tear lines in the form of an H. The thickness of the tear lines is adjusted so that the tear begins in the cross bar of the H. As the tear progresses, the cover deforms so that the unretained locking arms more tightly engage the housing rim. The tear line thickness beyond the cross bar increases to dissipate energy, but then thins again to direct the tear into a hinge region at a thicker portion of the molded cover. In this manner, the doors formed by the tearing of the cover are prevented from separating from the cover.

BEST MODE FOR CARRYING OUT THE INVENTION

Figure 1:
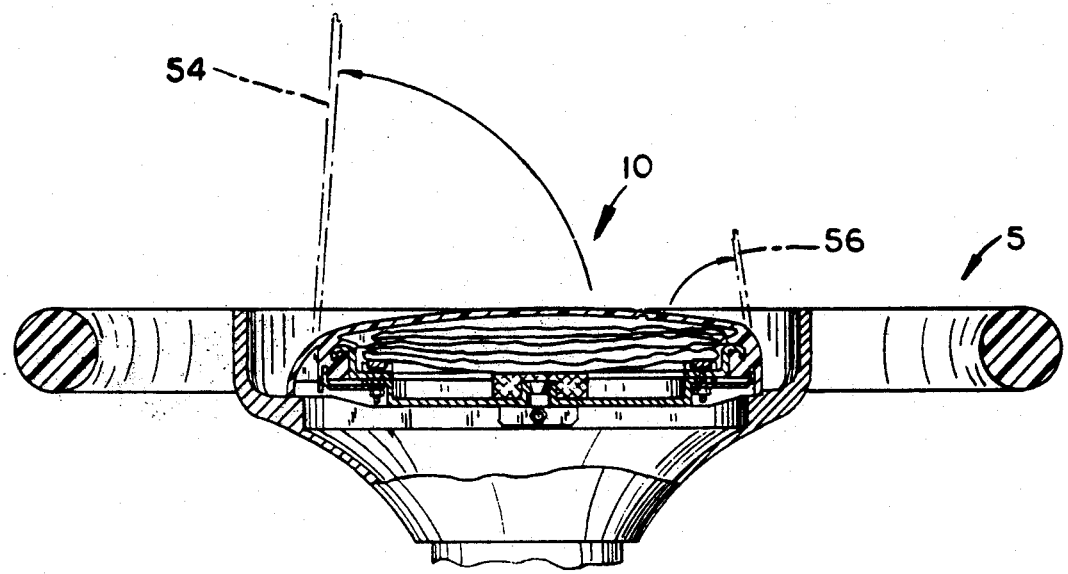
FIG. 1 is a cross-section illustrating the air bag assembly of the invention mounted within an automobile steering wheel.

Referring first to FIG. 1, there is illustrated an air bag assembly 10 in accordance with the present invention, mounted within an automobile steering wheel S. The air bag assembly 10 is illustrated in detail in FIGS. 2-4. It comprises a metal housing 12 having a circular aperture 14 in its base. An annular retaining ring 16 on the inside of the housing 12 surrounds the aperture 14 and is connected to the mouth of an air bag 18. A cup 20 is suspended beneath the aperture 14 and encloses an ignitor assembly 22. As the latter does not form a part of this invention, it will not be further described. Mounted to the bottom of the housing 12 and surrounding the cup 20 is a spider 24.

Figure 2:
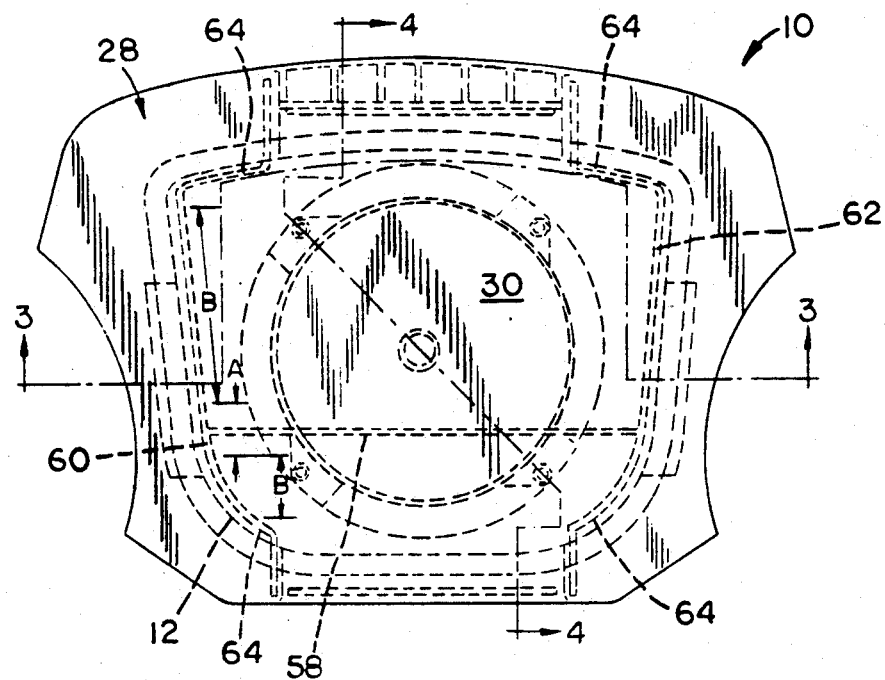
FIG. 2 is a front view of the assembly of the invention.
Figure 6:
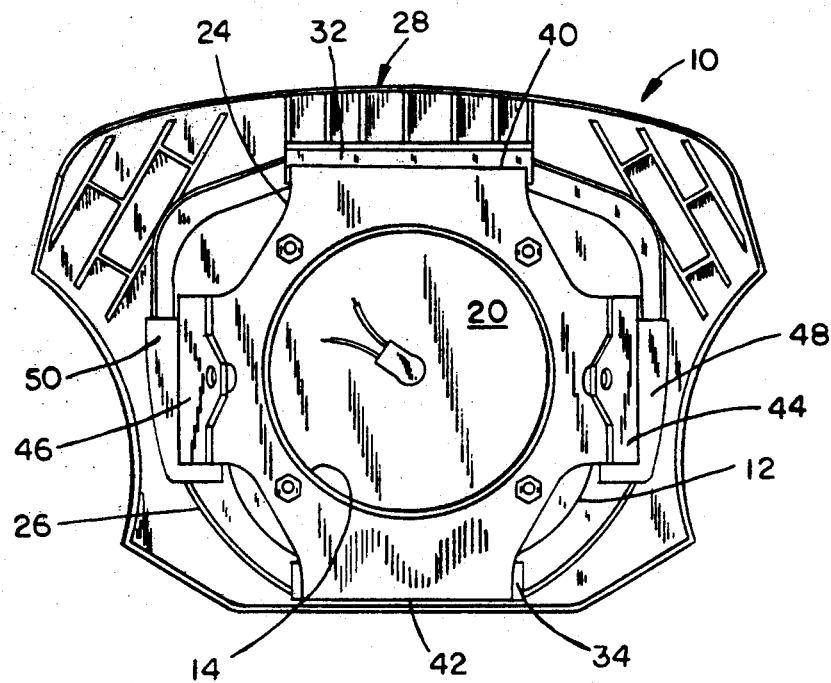
FIG. 6 is a rear view of the assembly of FIGS. 2-5.

As will be apparent from FIGS. 2 and 6, the housing 12 is roughly rectangular in shape and its upper edge carries a recurved rim 26. The cover 28 of the housing of this invention is a molded homogeneous member in that no reinforcements are molded into it. A high pressure injection molding material such as a thermoplastic is preferred. An especially preferred material would be a terpolymer elastomer made from ethylene-propylene diene monomer such as Santoprene (a trademark of Monsanto Company). The cover 28 includes a solid face 30 which serves to enclose the housing 12 and airbag 18. Integrally molded with the cover 28 and extending rearwardly from its face 30 are four locking arms. The four locking arms are independently movable for ease of mounting to the housing. In some embodiments, the locking arms are connected by flexible sidewalls which permit such desired independent movement. One set of locking arms 32, 34 will be seen in FIG. 4. They are on opposite sides of the housing 12 and each includes a notch 36 for receiving the rim 26 and a reentrant recess 38 as will be most apparent in FIGS. 4 and 6. The spider 24 which is mounted on the bottom of the housing 12 includes a pair of retaining clips 40, 42 which enter the recesses 38 and serve to retain the cover 28 in position. It will be noted that the spider 24 also includes a pair of mounting plates 44, 46. However, as these do not form a part of this invention, they will not be further described.

A second pair of locking arms 48, 50 projects from the rear of the cover 28 substantially orthogonal to the retained locking arms 32, 34. Each of the locking arms 48, 50 defines a notch 52 which engages the rim 26 of the housing 12. These locking arms 48, 50 may be further retained by the spider 24, if desired.

Figure 3:
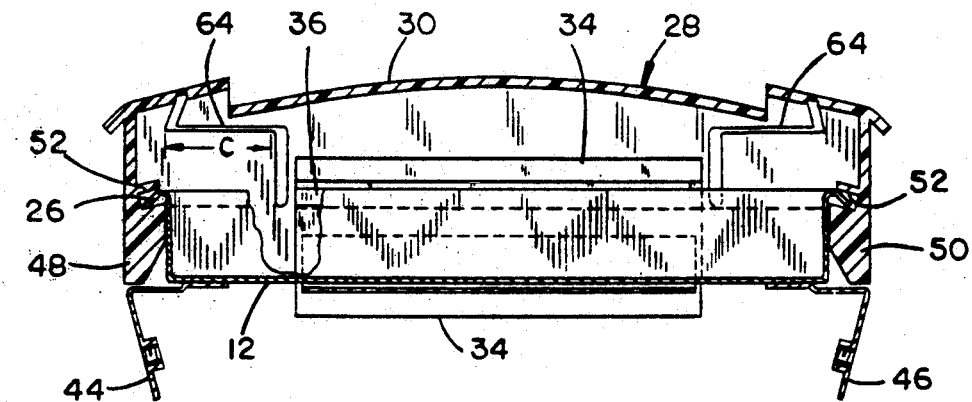
FIG. 3 is a cross-section taken substantially along the line 3—3 of FIG. 2.
Figure 4:
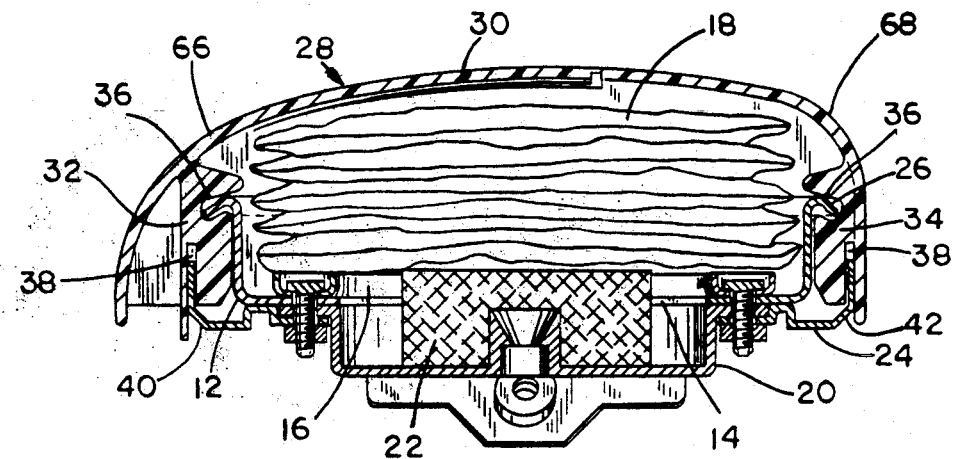
FIG. 4 is a cross-section taken substantially along the line 4—4 of FIG. 2.
Figure 5:
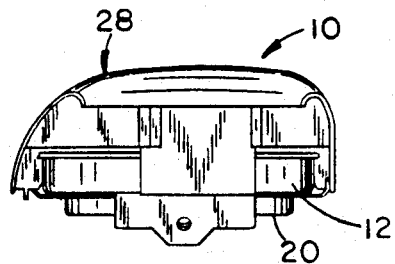
Fig. 5 is a side view, on a reduced scale, of the assembly of the invention.

Particularly referring now to FIGS. 2 and 3, it will be noted that the inner surface of the cover face 30 defines an array of tear lines. These are thin portions of the face 30 which split when the air bag 18 inflates to thereby form hinged doors 54, 56 as shown in FIG. 1. The tear lines are generally in the form of the letter H. The thinnest 58 of the tear lines represents the cross bar of the H as viewed in FIG. 2. Side tear lines 60, 62 represent the sides of the H. At each end of each side tear line 60, 62 a curved portion 64 leads into a hinge region 66, 68 adjacent one of the locking arms 32, 34.

The tear lines are designed to open in a preselected sequence which serves the multiple purposes of: (1) increasing the retention force between the cover 28 and the housing 12; (2) dissipating the energy of the expanding air bag 18; and (3) preventing the newly formed doors 54, 56 from detaching from the main body of the cover 28.

The tear lines within the region labelled "A" in FIG. 2 are the thinnest. The material underlying the lines in this region may be, for example, 0.5 mm thick. It will be seen that this includes all of the cross bar 58 and a small portion of each of the side tear lines 60, 62 adjacent the cross bar. As the bag expands, the cross bar tear line 58 begins to split at its center as the face 30 begins to bulge upwardly. The top and bottom of the cover 28, as viewed in FIG. 2, are firmly retained against the parallel edges of the housing rim 26 by the retaining clips 40, 42 of the spider 24. However, the absence of any stiffening of the cover 28 at the corners of the housing 12 causes the cover 28 to flex inwardly at its sides, thereby causing the locking arms 48, 50 seen in FIG. 3 to be forced inwardly against the housing 12. In this manner, the cover 28 resists any tendency to separate from the housing 12.

The cross bar tear line 58 continues to tear along its entire length and the tear continues into the thinner regions of side tear lines 60, 62. At that point, however, the tear enters the region "B" and in this region the thickness of the tear lines essentially doubles to 1.1-2 mm, thereby dissipating more of the air bag energy.

At the end of each of the thicker tear line portions, it is desired to channel the tear into a thick hinge area which includes the locking arms 32, 34. This is achieved by means of a tuned tensile energy dissipation line comprising the return portion 64 at each end of side tear lines 60, 62 in the region "C" shown in FIG. 3. The portions 64 tear away in tension to dissipate energy from the opening door. Within this region, the tear line thickness is reduced to approximately 0.7-0.9 mm and the line is approximately perpendicular to the direction of travel of the doors 54, 56. In this manner the tear is directed into the desired hinge region of extra thickness at the locking arms 32, 34.

Figure 7:
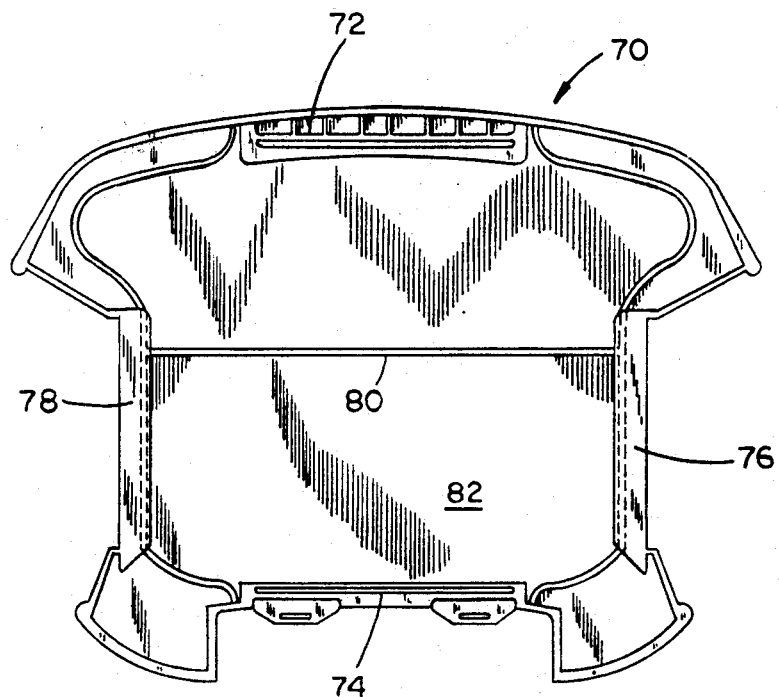
FIG. 7 is a rear view of another version of a cover in accordance with the present invention.

FIG. 7 illustrates a modified cover 70. Except for shape, the modified cover 70 closely resembles that of FIGS. 1-6 and includes, for example, retained locking arms 72, 74 and non-retained locking arms 76, 78. The tear line array differs slightly in that the cross bar tear line 80 is more centrally positioned within the face 82 of the cover 70. Otherwise, however, the cover 70 is quite similar to the previously described cover 28.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

What is claimed is:

1. In an air bag assembly for use in a motor vehicle including a rigid box shaped housing having a bottom and a side wall defining a substantially open top, a collapsed air bag within said housing, an inflator connected to inflate said air bag, and a cover closing said housing and defining tear lines adapted to be ruptured by the inflating air bag, the improvement which comprises:

said cover being of a substantially homogeneous material;

said tearlines being thin regions of the cover material forming a generally H-shaped pattern having at least three portions of differing thickness wherein the first and thinnest tear line portions are the crossbar of the H and the regions of the vertical bars immediately adjacent the crossbar, the succeeding, second portions of the vertical bars being thicker, with the end of each vertical bar terminating in a third portion defining a curve leading to a thickened hinge region of the cover, the third portion having a thickness intermediate that of the first and second portions;

an outwardly extending rim on said side wall disposed around at least a portion of said open top;

a plurality of locking arms integral with said cover and engaging said rim; and means secured to the bottom of said housing for retaining at least two of said locking arms in engagement with said rim during inflation of said air bag, whereby the thinnest tear line portions will be the first to rupture and form doors releasing said air bag and energy from the expanding air bag will be absorbed during the formation of said doors.

2. The improvement of claim 1 wherein said two retained locking arms are substantially diametrically opposed relative to said open top.

3. The improvement of claim 2 wherein the remaining locking arms number at least two and are substantially diametrically opposed relative to said open top.

4. The improvement of claim 3 wherein said two retained locking arms and said two remaining locking arms lie along substantially perpendicular axes.

5. The improvement of claim 1 wherein each of said thickened cover regions includes one of said retained locking arms.

6. The improvement of claim 5 wherein said two retained locking arms are substantially diametrically opposed relative to said open top.

7. The improvement of claim 6 wherein the remaining locking arms number at least two and are substantially diametrically opposed relative to said open top.

8. The improvement of claim 7 wherein said top retained locking arms and said two remaining locking arms are substantially orthogonal.

9. A homogeneous molded plastic cover for the open housing of an automotive air bag assembly which comprises:

a substantially flat face portion defining therein weakened tear lines forming a generally H-shaped pattern having at least three portions of differing thickness wherein the first and thinnest tear line portions are the crossbar of the H and the regions of the vertical bars immediately adjacent the crossbar, the succeeding, second, portions of the vertical bars being thicker, with the end of each vertical bar terminating in a third portion defining a curve leading to a thickened hinge area of the cover, the third portion having a thickness intermediate that of the first and second portions whereby the tear line portions rupture under the influence of an inflating air bag and doors are formed to release said air bag and absorb energy from the air bag during formation of said doors;

first and second locking arms extending rearwardly from said face portion for engagement with opposed portions of a rim of said housing and adapted to be retained in said engagement by an external retaining member; and third and fourth locking arms extending rearwardly from said face portion and orthogonal to said first and second arms for engagement with opposed portions of said housing rim.

10. The cover of claim 9 wherein said plastic is sufficiently resilient that, upon rupture and formation of said release doors, the third and fourth locking arms are forced into tighter engagement with said housing rim.

11. The improvement of claim 9 wherein each of said thickened cover regions includes one of said first and second locking arms.

12. The cover of claim 11 wherein said plastic is sufficiently resiliently that, upon rupture and formation of said release doors, the third and fourth locking arms are forced into tighter engagement with said housing rim.

* * * * *

UNITED STATES PATENT AND TRADEMARK OFFICE
CERTIFICATE OF CORRECTION

PATENT NO.   :  5,280,946
DATED        :  25 January 1994
INVENTOR(S)  :  Gary Adams et al.

It is certified that error appears in the above-identified patent and that said Letters Patent is hereby corrected as shown below:

At column 4, line 63, "wherein said top" should be -- wherein said two --.

At column 6, line 15, "sufficiently resiliently" should be
-- sufficiently resilient --.

Signed and Sealed this

Thirty-first Day of May, 1994

Attest:

BRUCE LEHMAN

*Attesting Officer*   *Commissioner of Patents and Trademarks*